US011725123B2

(12) United States Patent
Gat et al.

(10) Patent No.: US 11,725,123 B2
(45) Date of Patent: Aug. 15, 2023

(54) SILICON-BASED PROTECTIVE FILM FOR ADHESIVE, METHOD OF PRODUCTION THEREOF AND USES THEREOF

(71) Applicant: Coating Plasma Innovation, Fuveau (FR)

(72) Inventors: Eric Lucien Marie Gat, Fuveau (FR); Nicolas Vandencasteele, Fuveau (FR)

(73) Assignee: Coating Plasma Innovation, Fuveau (FR)

( * ) Notice: Subject to any disclaimer, the term of this patent is extended or adjusted under 35 U.S.C. 154(b) by 501 days.

(21) Appl. No.: 16/962,518

(22) PCT Filed: Feb. 8, 2019

(86) PCT No.: PCT/EP2019/053111
§ 371 (c)(1),
(2) Date: Jul. 16, 2020

(87) PCT Pub. No.: WO2019/154976
PCT Pub. Date: Aug. 15, 2019

(65) Prior Publication Data
US 2020/0407602 A1    Dec. 31, 2020

(30) Foreign Application Priority Data
Feb. 9, 2018  (FR) ..................................... 1851116

(51) Int. Cl.
*C09J 7/40* (2018.01)
*B05D 5/08* (2006.01)
*C09J 183/04* (2006.01)
*C09D 183/04* (2006.01)

(52) U.S. Cl.
CPC ............ *C09J 7/401* (2018.01); *B05D 5/08* (2013.01); *C09D 183/04* (2013.01); *C09J 183/04* (2013.01); *B05D 2518/10* (2013.01); *C09J 2203/334* (2013.01); *C09J 2301/122* (2020.08); *C09J 2301/124* (2020.08); *C09J 2301/416* (2020.08); *C09J 2401/006* (2013.01); *C09J 2483/005* (2013.01)

(58) Field of Classification Search
CPC .............................................. B05D 2518/10
See application file for complete search history.

(56) References Cited

U.S. PATENT DOCUMENTS

| 7,622,159 | B2 * | 11/2009 | Mertz | ........................ C09J 7/40 427/447 |
|---|---|---|---|---|
| 2004/0022945 | A1 | 2/2004 | Goodwin et al. | |
| 2015/0021339 | A1 | 1/2015 | Felts et al. | |
| 2015/0147510 | A1 | 5/2015 | Saito | |
| 2015/0273522 | A1 * | 10/2015 | Boscher | ................... B05D 1/62 428/141 |
| 2015/0368418 | A1 | 12/2015 | Wilken et al. | |
| 2017/0033269 | A1 * | 2/2017 | Yamabe | .................. C23C 16/50 |

FOREIGN PATENT DOCUMENTS

| CN | 103930595 | | 7/2014 |
|---|---|---|---|
| FR | 2989692 | A1 * | 10/2013 |
| GB | 2534080 | A * | 7/2016 |
| JP | 2012-006213 | | 1/2012 |
| JP | 2012-021201 | | 2/2012 |
| WO | WO 2013/032771 | | 3/2013 |
| WO | WO 2019/154976 | | 8/2019 |

OTHER PUBLICATIONS

"One-step Process to Deposits Soft Super-hydrophobic Film by Filamentary Dielectric Barrier Discharge-assisted CVD using HMCTSO as a Precursor" authored by Kim et al. and published in Surface & Coatings Technology (2009) 204, 428-432.*
Machine translation of FR 2989692 (no date).*
Rapport de Recherche Internationale et l'Opinion Ecrite [International Search Report and the Written Opinion] dated Mar. 14, 2019 From the International Searching Authority Re. Application No. PCT/EP2019/053111 and Its Translation of Search Report Into English. (9 Pages).
Notice of Reasons for Rejection dated Oct. 25, 2022 From the Japan Patent Office Re. Application No. 2020-539699. (2 Pages).
Examination Report dated Jul. 18, 2022 From the Taiwan Intellectual Property Office, Ministry of EconomicAffairs Re. Application No. 108104522 and its Translation into English. (19 Pages).
Notice of Reasons for Rejection dated Mar. 28, 2023 From the Japan Patent Office Re. Application No. 2020-539699 and Its Translation Into English. (4 Pages).
Translation of Notification of Office Action dated Oct. 15, 2021 From the China National Intellectual Property Adimmstration Re. Apllication No. 201980008814.0. (6 Pages).

\* cited by examiner

Primary Examiner — Marc S Zimmer

(57) ABSTRACT

Silicon-based protective film for adhesive or self-adhesive elements, characterized in that said protective film is based on silicone and has a level of extractible silicone less than or equal to 100 ng/cm$^2$, preferably less than or equal to 50, preferably less than or equal to 20 ng/cm$^2$, and even more preferably less than 10 ng/cm$^2$, the method of production thereof and uses thereof.

19 Claims, 1 Drawing Sheet

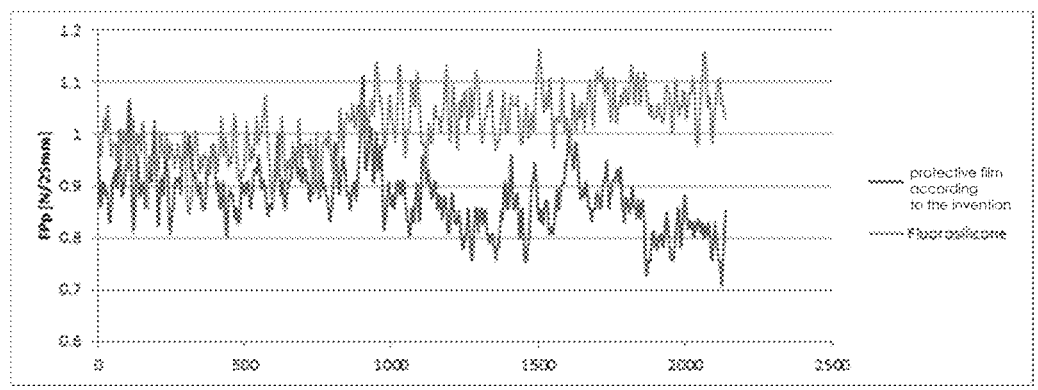

SILICON-BASED PROTECTIVE FILM FOR ADHESIVE, METHOD OF PRODUCTION THEREOF AND USES THEREOF

RELATED APPLICATIONS

This application is a National Phase of PCT Patent Application No. PCT/EP2019/053111 having International filing date of Feb. 8, 2019, which claims the benefit of priority of French Patent Application No. 1851116 filed on Feb. 9, 2018. The contents of the above applications are all incorporated by reference as if fully set forth herein in their entirety.

FIELD AND BACKGROUND OF THE INVENTION

The present invention relates to a silicon-based protective film, in particular based on silicone, more particularly based on polysiloxane for adhesive or self-adhesive optionally comprising a paper or plastic substrate provided with at least one layer of release coating, as well as to an assembly comprising an adhesive or self-adhesive element and at least one protective film as indicated above.

Adhesives may be of various types. In electronic applications, adhesives are typically based on acrylate, but without being limited thereto, and are preferably of electronic grade. In other cases, external films, such as those affixed to touch screens before use, are provided with adhesive or self-adhesive characteristics, by silicone adhesives. In other applications, such as in medical devices, the adhesive or self-adhesive is rather based on silicone and is in particular, but without being limited thereto, an adhesive or self-adhesive of medical grade.

The present invention further relates to the use thereof and to the method of production thereof.

In a first aspect, the present invention therefore relates to a silicon-based protective film for an adhesive or self-adhesive element.

Adhesive or self-adhesive elements may be of various forms. A distinction will be made between adhesive or self-adhesive elements comprising a first adhesive or self-adhesive face and a second face that is not adhesive, and adhesive elements comprising a first and a second face provided with adhesive or self-adhesive properties.

These adhesives are preferably pressure-sensitive adhesives or self-adhesives, and are of varying nature depending on their applications. In electronics, adhesives will be of an acrylic/acrylate nature, whereas the medical field generally prefers silicone adhesives or self-adhesives. They have excellent properties of resistance to heat and cold, electrical insulation and are particularly safe and reliable. Pressure-sensitive adhesive tapes based on silicone are easy to remove and yet have good characteristics of adhesion on a wide range of surfaces. They are found for example in adhesives for masking, speciality adhesives, protective films, two-sided adhesive tapes, and labels.

Adhesive or self-adhesive medical devices based on silicone for medical use may be of various forms, such as adhesive electrodes, intended to be placed on the skin, patches and intradermal adhesives, and adhesive or self-adhesive dressings.

For adhesive or self-adhesive elements comprising a first face provided with adhesive or self-adhesive properties and a second "non-stick" face, the adhesive or self-adhesive coating may be applied on various types of substrates such as paper to form labels, plastic or polymer substrates, woven or non-woven substrates, and medical devices such as for example medical dressings.

When commercially supplied adhesive or self-adhesive elements are substantially flat, they are generally applied on a "non-stick" substrate, i.e. on a substrate based on paper or plastic or polymer on which a non-stick coating is applied. These substrates provided with a non-stick coating form protective films in the form of peelable layers (called "release liners") affixed to many adhesive or self-adhesive elements based on silicone, such as on many adhesive or self-adhesive medical devices based on silicone for medical use.

There are therefore a large number of applications for silicon-based protective films for adhesives or self-adhesives based on silicone, for example such as for medical use.

When these adhesive or self-adhesive elements are marketed winded as rolls of adhesives, certain medical dressings, rolls of protective films, they may be, but are not always, applied on a "non-stick" substrate. Sometimes the adhesive or self-adhesive face is positioned on the second non-stick face of the adhesive element. In this case the non-stick coating forming the protective film may be applied directly on the second "non-stick" face of the adhesive or self-adhesive element, before or after it is coated with adhesive or with self-adhesive.

For adhesive or self-adhesive elements comprising a first face provided with adhesive or self-adhesive properties and a second face provided with adhesive or self-adhesive properties (double-sided adhesive or self-adhesive elements), the adhesive or self-adhesive coating may be applied on various types of substrates such as substrates of paper, of plastic or polymer, woven or non-woven substrates or even on the protective film before affixing the substrate thereto.

When commercially supplied two-sided adhesive or self-adhesive elements are substantially flat, they are generally positioned between two "non-stick" substrates, i.e. on substrates based on paper or plastic or polymer on which a non-stick coating is applied. These not-stick substrates form protective films in the form of peelable layers (called "release liners") affixed on many adhesive elements.

When these two-sided adhesive or self-adhesive elements are marketed winded as rolls of adhesives, certain medical dressings, certain rolls of protective films, they may be applied on a "non-stick" substrate that will comprise a substrate provided with a non-stick coating on both faces of the substrate forming the protective film, also in the form of a peelable layer.

There are therefore a large number of applications for silicon-based protective films for adhesive or self-adhesive elements.

In the sense of the present invention, surfaces that have low adherence will be called "non-stick". This adherence is characterized relative to a second surface that is brought into contact with the surface with low adherence.

Silicon-based protective films for adhesive elements applied on a substrate are known, for example such as films for temporary protection of adhesives, which generally consist of a silicone layer. This silicone layer gives the substrate properties of weak adhesion. The latter makes it possible to protect the adhesive before it is applied on the object. The silicone layer may be crosslinked thermally or by UV at the surface of a substrate (paper or plastic), deposited chemically in the liquid phase (wet chemical deposition), chemically in the vapour phase assisted by plasma (plasma-assisted chemical vapour deposition), by reaction of compounds or monomers containing fluorine and/or silicon, by coating using powder (powder coating).

Unfortunately, these conventional films for temporary protection of adhesives are not usable in certain electronic applications (for example, such as for hard disks, or touch screens positioned by adhesives of optical grade, as the silicone applied on the substrate is partly transferred to the adhesive and contaminates the latter unacceptably, since it interferes with electronic components.

Protective films based on silicone for adhesive or self-adhesive medical devices for medical use applied on a substrate are known, for example such as films for temporary protection of adhesives, which generally consist of a silicone layer. However, these films for temporary protection of adhesives are only compatible with acrylic adhesives, or rubber.

Protective films based on fluorosilicone for adhesive or self-adhesive medical devices for medical use applied on a substrate are known, for example such as films for temporary protection of adhesives based on silicone.

This silicone or fluorosilicone layer gives the substrate properties of low adhesion. The latter makes it possible to protect the adhesive before it is applied on the object or the body. The silicone layer may be crosslinked thermally or by UV at the surface of a substrate (paper or plastic), deposited chemically in the liquid phase (wet chemical deposition), chemically in the vapour phase assisted by plasma (plasma-assisted chemical vapour deposition), by reaction of compounds or monomers containing fluorine and/or silicon, by coating using powder (powder coating).

The treatment techniques most commonly used consist of wet deposition based on silicone coating. This type of treatment is carried out in two steps, the first step of the treatment consisting of depositing an emulsion, and the second step consisting of drying the surface coating formed. This formed silicone layer also endows the substrate with properties of low adhesion, allowing the adhesive to be protected before it is applied on the object.

Unfortunately, many problems are encountered with these types of treatments, and may for example be as follows: the deposition process is sometimes long and requires many intermediate steps. There is high energy expenditure. Certain chemical treatments based on silicone coating involve organic solvents and therefore are not environmentally compatible; others use aqueous-phase emulsions that employ emulsifiers, with risk of transfer to the adhesive. When a substrate possessing such a surface coating is applied as a substrate for an adhesive, for example as a substrate for a label, there is an appreciable possibility of transfer, for example of silicone material onto the adhesive, which has the effect of reducing its tackiness, or onto any surface coming into contact with the coating, which has the effect of causing undesirable contamination.

Alternatively, in the presence of a self-adhesive element, for example such as a self-adhesive element based on silicone, transfer of silicone material from the protective film onto the self-adhesive element may on the one hand reduce its adhesiveness, but may also react with the silicon-based material of the adhesive or self-adhesive element. In fact, siliconized adhesive or self-adhesive elements are formed from crosslinking agent, catalyst and silicone and often the reaction has not gone to completion, in which case transfer of silicone material onto the self-adhesive element may generate uncontrolled and/or undesirable reaction products as there is creation of chemical bonds between the silicone-based adhesive or self-adhesive and the protective film, which reduces, or even annihilates its peelability, which represents a major drawback, particularly irksome in the medical field, more precisely in the field of medical devices (see the article "*Release liner Selection for drug delivery and Medical device design*"—Engineering 360 *Media Solutions* August 2017).

This applies both to protective films used in the electronics industry and to medical devices, such as dressings, patches and electrodes to be applied on the skin. In the latter case, uncontrolled reaction may cause immune or allergic reactions, or incompatibility of the product with the medical sector. Moreover, release of silicone material on the self-adhesive element forming the dressing may release the silicone material into the wound underneath the dressing, which of course is undesirable.

There is therefore a general need for protective films having low release of silicone so as not to decrease the adhesive qualities of the adhesive elements, but also specific needs for adhesive or self-adhesive medical devices based on silicone for medical use, in the medical sector and in the field of electronics, where contamination by silicones is to be avoided. In fact, contamination of electronic components in the finished state by labels, contamination of the atmosphere of clean rooms, contamination of wounds by silicones or occurrence of uncontrolled reactions between the self-adhesive substrate and the silicone potentially released from the protective film are totally undesirable.

There are also films for temporary protection of adhesives without silicone. Although these silicone-free films do not present a risk of contamination of the environment or of the adhesive with silicones, they unfortunately have excessive peeling forces and have a "zippy" effect (jerky peeling), which is annoying for the user.

SUMMARY OF THE INVENTION

The present invention provides a silicon-based protective film, more particularly based on silicone, in particular based on polysiloxane for adhesive or self-adhesive elements as mentioned at the beginning, characterized in that said protective film is based on silicone and has a level of extractible silicone less than or equal to 100 $ng/cm^2$, preferably less than or equal to 50 $ng/cm^2$, more preferably less than or equal to 20 $ng/cm^2$, and even more preferably less than 10 $ng/cm^2$, preferably less than 5 $ng/cm^2$, being measured by the amount of silicone that is released in the form of monomers or oligomers, either non-volatile (IDEMA Standards M7-98 "Organic Contamination as Nonvolatile Residue (NVR)", ECSS-Q-ST-70-05C "Detection of organic contamination of surfaces by infrared spectroscopy", Seagate 20800032-001 Rev C. & 20800014-001 Rev G, Western Digital 2092-772141 Rev AD & 2092-771888 Rev AC), or volatile (IDEMA Standards M11-99 "General Outgas Test Procedure by Dynamic Headspace Analysis", Seagate 20800020-001 Rev N, Western Digital 2092-001026 Rev AC & 2092-771888 Rev AC).

For example, it may be a protective film based on polysiloxane of medical grade for a silicone-based adhesive or self-adhesive for medical devices, and remains relatively inert for example with medicinal substances that would be diffused through the adhesive.

In fact it became apparent according to the present invention that it was possible to supply a protective film in which contamination by transfer is particularly low while offering the possibility of having recourse to silicones that have improved peeling characteristics, without having to use organic or fluorinated molecules, which give rise to other difficulties.

Moreover, the use of protective films based on silicone advantageously allows a hydrophobic character to be imparted to the substrate on which the protective film is affixed, enabling it to be used in fields such as in electronics, but also in the medical sector, and preserves the qualities of the adhesive element over time.

The silicon-based protective film for adhesive or self-adhesive elements according to the present invention has both low surface energy and low adherence (so-called "release" effect) while being hydrophobic, and releases hardly any extractible silicone. The unique combination of these characteristics of the protective film according to the present invention therefore makes it applicable in fields with higher requirements, such as the electronics sector, as it has a force of adhesion between the protective film (a hydrophobic non-stick substrate) and a substrate made adhesive or self-adhesive, for example a label, an adhesive tape, double-sided adhesive, protective film, in particular of electronic grade, adhesive tape or a dressing, a patch, an electrode or a dressing, arranged to be in contact with the skin, in particular of medical grade, but is also particularly suitable for pressure-sensitive adhesives and self-adhesives based on silicone.

According to the present invention, when the level of extractible silicone is measured, we measure the amount of silicone (in particular in the form of monomers or oligomers) that is released, either after rinsing a determined surface sample of the protective film with hexane (IDEMA Standards M7-98 "Organic Contamination as Nonvolatile Residue (NVR)", or standards ECSS-Q-ST-70-05C "Detection of organic contamination of surfaces by infrared spectroscopy", Seagate 20800032-001 Rev C. & 20800014-001 Rev G, Western Digital 2092-772141 Rev AD & 2092-771888 Rev AC), or by degassing a determined surface sample of the protective film (IDEMA Standards M11-99 "General Outgas Test Procedure by Dynamic Headspace Analysis", Seagate 20800020-001 Rev N, Western Digital 2092-001026 Rev AC & 2092-771888 Rev AC).

The protective film according to the present invention is a protective film that can be applied on an existing substrate, for example such as a face of an existing adhesive tape, or may comprise a substrate made of paper, woven or nonwoven fabric, or plastic.

In a preferred embodiment of the present invention, the silicon-based protective film for adhesive or self-adhesive elements has a peeling force less than or equal to 2N/25 mm measured on Tesa™ 7475 adhesive measured according to standard FTM10.

In another preferred embodiment of the present invention, the silicon-based protective film for adhesive or self-adhesive elements has a residual adhesion greater than or equal to 80%, measured according to standard FTM11.

The film according to the present invention in fact has the characteristic of not damaging the performance of the adhesive or self-adhesive. The residual adhesion, i.e. the force of adhesion of the adhesive after exposure to the film for temporary protection of adhesive is greater than or equal to 80% of the initial force of adhesion of the adhesive (before contact with the film for temporary protection of adhesive).

In yet another preferred embodiment of the present invention, the silicon-based protective film for adhesive or self-adhesive elements has a level of nitrogen less than or equal to 1 at % (atomic %), measured by the XPS/ESCA technique.

These values were determined from survey spectra with equipment of the Nova-Kratos™ type with a monochromatized Al-Kα source (225 W) on an area of 300μ×700 μm in normal detection (detection angle θ=0°). The depth of analysis in these conditions is less than 10 nm.

In a variant according to the present invention, the silicon-based protective film for adhesive or self-adhesive elements is formed of a series of silicone-based layers, deposited on top of one another.

Advantageously, in the silicon-based protective film for adhesive or self-adhesive elements according to the present invention, each silicone layer has a thickness between 5 nm and 100 nm, preferably between 10 nm and 60 nm, and even more preferably between 10 nm and 30 nm.

Preferably, the silicon-based protective film for adhesive or self-adhesive elements according to the present invention has a thickness between 5 nm and 100 nm, preferably between 10 nm and 60 nm, and more preferably between 10 nm and 30 nm.

In fact, if the thickness of the silicone layer is insufficient, the layer does not cover the substrate uniformly, which results in an increase in peeling force and a zippy effect; if the thickness is excessive, the risk of contamination and/or transfer increases because the total amount of silicone becomes too great (knowing that the total amount of silicone transferable in the worst case is proportional to the thickness of the layer). It is preferable for the thickness to be between 10 nm and 60 nm, and even more preferably between 10 nm and 30 nm. Under 5 nm the deposit is non-uniform, which causes undesirable jerky detachment (zippy effect). Moreover, the force of adhesion increases when the thickness is too small. Above a thickness of 30 nm the required qualities of the layer do not improve further, but the total amount of silicone transferable becomes needlessly large.

In a particular embodiment of the present invention, the silicon-based protective film for adhesive or self-adhesive elements has at least one surface having a static contact angle of water greater than 90°, preferably greater than 95°, and even more preferably greater than 100° as measured on apparatus Krüss DSA25.

In yet another particular embodiment of the present invention, the silicon-based protective film for adhesive or self-adhesive elements has a surface energy less than 30 mN/m, preferably less than 25 mN/m and even more preferably less than 20 mN/m, as calculated from measurements of contact angle of two liquids (water and diiodomethane) according to the model of Owens and Wendt.

The present invention also relates to an assembly comprising at least one silicon-based protective film for adhesive or self-adhesive elements according to the present invention and an adhesive or self-adhesive element having a first face provided with adhesive or self-adhesive properties.

More particularly, in the assembly according to the present invention, said protective film being affixed on said first face provided with adhesive or self-adhesive properties in the form of a protective film is peelable.

Even more preferably, in the assembly according to the present invention, said adhesive or self-adhesive element has a first face provided with adhesive or self-adhesive properties and a second non-stick face, said protective film being affixed on said second non-stick face.

In a variant of the assembly according to the present invention, said adhesive or self-adhesive element has a second face provided with adhesive or self-adhesive properties on which a second silicon-based protective film is optionally affixed.

In another embodiment according to the present invention, said adhesive element is a label.

In yet another embodiment according to the present invention, said adhesive element is an adhesive or self-adhesive medical device, is an adhesive or self-adhesive medical dressing, for example siliconized, a patch, an adhesive electrode intended to be in contact with the skin.

The present invention also relates to a method of producing a silicon-based protective film for adhesive or self-adhesive elements provided with at least one silicone-based coating layer intended to rest on a substrate of paper, woven or non-woven fabric or plastic.

Methods of producing protective films for adhesive or self-adhesive elements are known from the prior art.

For example, a method of plasma treatment using a low-frequency reactor (2 to 100 kHz), with an alternating voltage from 5 to 50 kV pulsed at a switching frequency between 30 and 5000 Hz, is known from document WO 2016/071 256. These pulses make it possible to induce a modification of the properties of the release layer, in contrast to treatments with conventional plasma (not pulsed).

Document WO 2016/071 256 describes a protective film comprising a substrate and a release layer based on a long list of compounds based on silicone, but also based on other molecules such as fluorinated alkanes and polyolefins, carbamates, waxes and mixtures thereof. Documents WO 2015/019063 or WO 2015/019062 describe similar protective films.

However, this document is silent regarding the level of silicone extractible from the protective film based on silicone for adhesives, as well as regarding the residual adhesion of the adhesive after separation of the protective film.

There is therefore still a need to identify a method for producing a silicon-based protective film for adhesive or self-adhesive elements in which the level of extractible silicone is low.

The present invention relates to the specific field of surface deposits allowing the surface of a substrate to be rendered hydrophobic and non-stick. It would be desirable to have a new method for efficient execution of deposition of a coating with a hydrophobic character on the surface of a substrate, said coating having both a low surface energy and low adherence (so-called "release" effect) while addressing the problems mentioned above that are encountered in the existing methods for surface treatments. In fact, in several technical fields, in particular in the field of adhesive films, these two characteristics are advantageously combined, which allows controlled reduction of the force of adhesion between a hydrophobic non-stick substrate (i.e. the substrate obtained after the method of surface treatment according to the invention) and an adhesive substrate, for example a label or an adhesive or self-adhesive medical device based on silicone for medical use. Moreover, it must be possible to carry out this method on moving plastic films.

The method according to the present invention is characterized in that it comprises the following steps:

a) travel of said substrate from a source of substrate in a plasma coating cell to form said protective film, to a collection point of said protective film, b) exposure of a first face of said substrate to plasma deposition in a chamber in which there is an atmosphere consisting of at least one plasma gas to controlled discharge by dielectric barrier (DBD) of said plasma gas selected from the rare gases or mixtures thereof in the presence of at least one silicone precursor selected from the siloxanes comprising a cyclic characteristic group, c) formation of said silicone-based coating from said silicone precursor in said plasma and, d) collection of said protective film provided with said at least one silicone-based coating layer.

The problem is solved according to the invention by a method of surface treatment of a moving substrate, notably a flexible or semi-rigid polymer film or paper passing through the treatment zone. More precisely, it is a method in which the substrate is subjected to a plasma generated in a gas mixture, which leads to modification of the surface state of this substrate, notably by the formation of a deposit on the aforementioned surface.

The invention relates in particular to a method which may potentially be carried out at a pressure close to atmospheric pressure, and which is suitable for continuous surface treatment of polymer films in rolls (method of the "roll-to-roll" type).

The method according to the invention comprises a step in which at least one surface of said substrate is exposed to a discharge controlled by a dielectric barrier (DBD=Dielectric Barrier Discharge, a technique that is known per se) at atmospheric pressure of a plasma gas (selected from the noble gases) in the presence of at least one silicon precursor selected from the siloxanes comprising a cyclic characteristic group, to form said coating on said moving substrate.

The film treated by the method according to the invention has on its outside surface (i.e. the surface that is not in contact with the substrate) a force of adhesion less than that of the uncoated film, it being possible to modulate said force of adhesion by means of the deposition parameters.

The combination of the plasma-forming atmosphere consisting of noble gases and precursors sprayed in the plasma in the chamber, which are selected from the siloxanes comprising a cyclic characteristic group, makes it possible, particularly surprisingly, to obtain a silicon-based protective film that has a very low level of extractible matter.

Advantageously, according to the present invention, said plasma gas is argon or helium, and preferably argon.

In an advantageous embodiment of the present invention, said silicone precursor is a cyclosiloxane.

In a particular advantageous embodiment of the present invention, said silicone precursor is cycloalkylsiloxane, preferably a cyclomethylsiloxane.

Advantageously said silicone precursor is decamethylcyclopentasiloxane (CAS No. 541-02-6) or octamethylcyclotetrasiloxane (CAS No. 556-67-2), hexamethylcyclotrisiloxane (CAS No. 541-05-9), dodecamethylcyclohexasiloxane (CAS No. 540-97-6) or a mixture of two or more of these.

Advantageously, in the method of production according to the present invention, said gas atmosphere in the chamber has an oxygen content less than or equal to 50 ppmv, preferably less than or equal to 20 ppmv, and even more preferably less than or equal to 10 ppmv.

In a preferred embodiment of the method according to the invention, said substrate moves at a substrate travel speed between 10 and 60 m/min, preferably between 10 and 50 m/min, preferentially between 20 and 40 m/min, advantageously between 25 and 40 m/min, very advantageously between 30 and 40 m/min.

Advantageously, in the method of production according to the present invention, said plasma deposition has a deposition time less than or equal to 4 seconds, preferably less than or equal to 2 seconds, and even more preferably less than or equal to 1 second.

Very preferably, treatment is carried out in a single pass, and without any post-treatment. This helps to maximize the productivity of the machine (expressed in unit of area treated per unit of machine time) and to minimize the operating cost of the method.

This makes it possible to obtain a high speed of travel, and results in a very thin layer. The high speed of travel means high productivity (expressed in unit of area treated per unit of machine time), and therefore a low operating cost of the method. The small thickness means, on the one hand, that the consumption of precursor molecule per unit of surface area treated is low (which helps to minimize the operating cost of the method), and, on the other hand, that the total amount of silicone per unit of surface area that may theoretically be transferred onto the adhesive when the layer is used as intended is low.

In a preferred embodiment of the present invention, said gas atmosphere in the chamber is at atmospheric pressure ±100 Pa.

Here, "pressure close to atmospheric pressure" means a pressure that differs from atmospheric pressure by a pressure difference (positive or negative) that does not exceed some tens or about a hundred Pa. More precisely, preferably the pressure in said chamber differs from atmospheric pressure at most by ±100 Pa.

In a preferred embodiment of the present invention, said discharge is at low frequency, preferably with a power density that is between 0.10 W/cm$^2$ and 10 W/cm$^2$, more preferably between 0.15 and 8 W/cm$^2$, more particularly between 0.2 and 5 W/cm$^2$, or even between 0.25 W/cm$^2$ and 0.8 W/cm$^2$, and even more preferably between 0.35 W/cm$^2$ and 0.7 W/cm$^2$, the unit of area referring to the cumulative area of the electrodes.

The present invention finally relates to the use of a protective film according to the invention with an adhesive or self-adhesive element comprising a first face provided with adhesive or self-adhesive properties.

In a variant according to the present invention, the present invention finally relates to the use of a protective film based on polysiloxane for adhesive or self-adhesives based on silicone according to the invention with an adhesive or self-adhesive element based on silicone, for example such as a pressure-sensitive adhesive based on silicone or adhesive medical device comprising a first adhesive face on which the adhesive is located.

In a preferred use, the protective film is in the form of a peelable protective film, in contact with the first face.

In a particular use according to the present invention, said adhesive element has a first face provided with adhesive or self-adhesive properties and a second non-stick face, said protective film being affixed on said second non-stick face.

In another particular use according to the present invention, said adhesive element has a second face provided with adhesive or self-adhesive properties on which a second silicon-based protective film is optionally affixed.

In a particularly preferred use, said adhesive element is a label, a double-sided adhesive tape, a pressure-sensitive protective film based on silicone.

In another particularly preferred use, said adhesive or self-adhesive medical device is an adhesive or self-adhesive medical dressing, for example siliconized, a patch, an adhesive electrode intended to be in contact with the skin.

Preferably, the aforesaid uses take place in a clean room. Moreover, the method of production according to the present invention may be carried out in a clean room.

Furthermore, the protective film according to the invention may be sterilized by conventional techniques (gamma sterilization, in gaseous medium, UV etc.).

DESCRIPTION OF SPECIFIC EMBODIMENTS OF THE INVENTION

Brief Description of the Several View of the Drawings

FIG. 1 is a graph which illustrates the peeling force of an adhesive on a protective film according to the invention compared with the peeling force of the same adhesive on a commercial protective film based on fluorosilicone.

Other features, details and advantages of the invention will become clearer from the description given below, which is non-limiting, and referring to the examples and the appended figures.

Unless stated otherwise, the concentrations of gases given in ppm (parts per million) are ppm by volume (ppmv).

According to the invention, the substrate is exposed to a plasma at atmospheric pressure. The plasma is generated in a plasma gas (He, Ar) containing one or more siloxane precursors; this precursor will be specified below. Exposure of the substrate to the plasma and to the molecules of precursor causes formation of a thin deposit on the surface of the substrate. This thin deposit endows the protective film for adhesive elements with low adhesion and a very small amount of extractible silicone. Moreover, this deposit does not significantly reduce the subsequent adhesion of the adhesive to the protective film that comprises it.

In the method of production of the protective film according to the present invention, plasma deposition at atmospheric pressure therefore makes it possible to produce a non-stick layer on a substrate to form a protective film (release liner).

The method according to the invention may be carried out in a reactor, inside which a dielectric barrier discharge (DBD) takes place.

Advantageously, the substrate travels through the treatment zone in roll-to-roll mode.

In a preferred embodiment, the treatment reactor is of the roll-to-roll DBD type; it typically comprises the following elements:

A treatment cylinder (for example with a diameter of 400 mm and a length of 800 mm) with a suitable dielectric coating. This cylinder propels the flexible film to be treated under the treatment electrodes at a speed selected in the range between 5 and 200 m/min.

A treatment chamber located above the treatment cylinder and comprising electrodes and the devices for injecting gases; injection devices adjoining the electrodes make it possible to inject the gas or gases directly in front of the electrodes and on the surface of the film to be treated, namely: inerting gas, plasma gas, precursor, carrier gas, optional doping gas.

The electrodes are connected to a low-frequency HV generator (typically one to some tens of kHz) of variable power (0.1 to 10 W/cm$^2$). The power density is between 0.10 W/cm$^2$ and 10 W/cm$^2$, more preferably between 0.15 and 8 W/cm$^2$, more particularly between 0.2 and 5 W/cm$^2$, or even between 0.25 W/cm$^2$ and 0.8 W/cm$^2$, and even more preferably between 0.35 W/cm$^2$ and 0.7 W/cm$^2$, the unit of area referring to the cumulative area of the electrodes.

An extraction system in the treatment chamber makes it possible to evacuate the plasma gas as well as any by-products created in the plasma and not transformed into deposit. The plasma gas generates the plasma, this is a specific feature of discharge at atmospheric pressure. The carrier gas is injected to accompany the precursor (monomer). The dopant may be injected in a small amount relative to the inerting gas, plasma gas and carrier gases. The inerting gas, plasma gas and/or carrier gas may be identical or different, and may be argon and/or helium.

Advantageously, an inerted treatment atmosphere is maintained in the treatment reactor with a level of oxygen less than 50 ppm, preferably less than 20 ppm, and even more preferably less than 10 ppm.

A reactor of this kind is described for example in patent application WO 2016/170242 in the applicant's name.

The gap between the active surface of the electrodes and the film travelling along under them on the treatment roll must be adjusted very precisely in order to ensure stability and homogeneity of the plasma, two necessary conditions for obtaining a thin deposit with acceptable three-dimensional homogeneity. As an example, if the distance between the film and the active surface of the electrodes is set at 1 mm, this distance is advantageously stable with a standard deviation of ±0.2 mm.

The precursor is advantageously injected directly into the discharge, this makes it possible to maximize the concentration of the latter between the electrodes. This is useful for making treatment possible in a single pass. A high concentration of precursor in the discharge generally leads to the formation of powder in the plasma; these powders make the product unusable and cause many problems in reactor maintenance. With a high gas velocity it is possible to reduce the residence time of the precursor molecules in the plasma; this avoids the formation of powder. Thus, it is possible to work at a high concentration of precursor, which makes it possible to carry out deposition in a single pass without forming powder.

It should also be noted that exposure of the protective film formed to the plasma lowers the performance of the thin layer. Therefore deposition in several passes is not necessarily desirable.

As an example, the following parameters were used in a reactor of the type described in WO 2016/170242:

The flow rate of the precursor is preferably between 8 g/h and 14 g/h, more preferably between 8.5 g/h and 13 g/h; a good result is obtained with a value of 10 g/h, but the result is poorer with a value of 5 g/h or of 20 g/h. The speed of the substrate is preferably between 3 m/min and 8 m/min, preferably between 3.5 m/min and 8.5 m/min, but with a value of 2 m/min or of 10 m/min the result is poorer. The power is preferably between 450 W and 700 W, more preferably between 500 W and 650 W, but with a value of 300 W or of 900 W the result is poorer. The plasma gas is preferably argon.

In the context of the present invention, the precursor should be a siloxane comprising a cyclic characteristic group, for example such as a cycloalkylsiloxane, preferably a cyclomethylsiloxane. The inventors discovered, surprisingly, that the linear alkylsiloxanes, therefore not comprising a cyclic characteristic group, do not give satisfactory results, whereas the use of siloxanes comprising a cyclic characteristic group, such as cycloalkylslioxanes, and in particular cyclomethylsiloxanes, makes it possible to solve the problem that the present invention tries to address.

Advantageously, said silicone precursor is decamethylcyclopentasiloxane (CAS No. 541-02-6) or octamethylcyclotetrasiloxane (CAS No. 556-67-2), hexamethylcyclotrisiloxane (CAS No. 541-05-9), dodecamethylcyclohexasiloxane (CAS No. 540-97-6) or a mixture of two or more of these.

EXAMPLES

Example 1

Surface treatments were carried out by depositing a thin layer in an argon plasma at atmospheric pressure. The plasma gas was argon. Table 1 below presents the best results obtained on a PET substrate for forming a protective film according to the invention. In particular, the peeling force and the residual adhesion of the adhesive were determined after removing the protective film of treated PET.

Several types of organosiloxane monomers were used for producing the deposits of silicon-based release layers, in proportions of monomer ranging from 100 to 10 000 ppm (by volume):

DMCPS=decamethylcyclopentasiloxane; CAS No. 541-02-6;

OMCTS=octamethylcyclotetrasiloxane, CAS No. 556-67-2;

OTES=triethoxy(octyl)silane, CAS No. 2943-75-1

HMDSO=hexamethyldisiloxane, CAS No. 107-46-0;

Two types of OH or NH functionalized reactive silicone precursor monomers (Silmer™) were also used for making thin deposits based on silicone, in proportions of monomer ranging from 100 to 5000 ppm. The trade name of these monomers is: Silmer™ NH Di-8 and Silmer™ OH A0 UP (supplied by Siltech). They are linear polyalkylsiloxanes; more precisely, Silmer™ NH Di-8 is a linear amino polydimethylsiloxane (molecular weight about 860 to 940) comprising NH end groups, and Silmer™ OH A0 UP is a polydimethylsiloxane with a propylhydroxy terminal function (molecular weight about 280).

For comparison, a non-silicone type of monomer (dodecyl vinyl ether, CAS No. 765-14-0) was investigated for making silicon-free release deposits, in a proportion of monomer of 100 ppm. A monomer of the fluorosilicone type was also tested.

The best results were obtained on PET film with a width of 600 mm, treated at 20 m/min with a 600 W argon plasma, into which 60 g/h of DMCPS is introduced (sample called "DMCPS"), as can be seen, although pre-treatment can possibly be carried out, it was not necessary in this case while allowing excellent results. The same preferred method was carried out on paper and on BOPP film, with excellent results.

Table 1 summarizes the characteristics of the protective film measured on the samples produced according to the present invention.

TABLE 1

| Monomer | $\Theta_{water}$ [degrees] | Es [mN/m] | Fp 7475 [N/25 mm] | Fp MD15 [N/25 mm] | AR Nitto 31b |
|---|---|---|---|---|---|
| None | 70 | 52.5 ± 0.5 | 22.6 ± 0.5 | | |
| HMDSO (*) | 102-104 | 25-30 | 5 ± 5 (Zippy) | | |

TABLE 1-continued

| Monomer | Θ$_{water}$ [degrees] | Es [mN/m] | Fp 7475 [N/25 mm] | Fp MD15 [N/25 mm] | AR Nitto 31b |
|---|---|---|---|---|---|
| DMCPS (+) | 112 ± 1 | 21 ± 2 | 1.0 ± 0.5 | 0.25 ± 0.10 | 95 |
| Dodecylvinyl-ether (−) | | | 9.42 ± 0.73 | | |
| OTES (*) | | | 11.01 ± 2.82 | | |
| Silmer ™ NH Di-8 (*) | | | 9.8 ± 6.1 | | |
| Silmer ™ OH (*) | | | 2.9 ± 2 | | |
| OMCTS (+) | 110 | 64 | 0.4 ± 0.03 | 0.11 ± 0.09 | 97 |

(+) Cyclosiloxane according to the invention.
(*) Linear siloxane, not according to the invention.
(−) not according to the invention In this table:
"Zippy" indicates that the adhesive detaches jerkily from the protective film;
θ$_{water}$ water is the static contact angle of water measured on Krüss DSA25 apparatus;
Es is the surface energy calculated from the measurements of contact angle of two liquids (water and diiodomethane) according to the model of Owens and Wendt;
Fp 7475 is the peeling force of TESA 7475 adhesive measured according to standard FTM 10 with AR1000 apparatus;
Fp MD15 is the peeling force of MD15 adhesive (ultra-pure acrylic adhesive for applications in the field of electronics), supplied by the company JDC (Tennessee, U.S.A.).
AR Nitto 31b is the residual adhesion of the adhesive Nitto 31b measured on a glass plate cleaned according to standard FTM 11; This adhesive is used by those skilled in the art for the measurement of residual adhesion.
Standards FTM 10 and FTM 11, familiar to a person skilled in the art, are published by FINAT (International Federation of Manufacturers and Processors of Adhesives and Heat-sealing Adhesives on paper and other substrates):
FTM 10 "Quality of silicone coated substrates for self-adhesive laminates: release force (300 mm per minute)",
FTM 11 "Quality of silicone coated substrates for self-adhesive laminates: subsequent adhesion"
Table 2 shows the results of determinations (in atomic percentages) of carbon, oxygen, silicon and nitrogen in three samples treated with plasma at atmospheric pressure. These values were determined from survey spectra with equipment of the Nova-Kratos™ type with a monochromatized Al-Kα source (225 W) on an area of 300μ×700 μm in normal detection (detection angle θ=0°). The depth of analysis in these conditions is less than 10 nm.

TABLE 2

| Sample | Carbon [at %] | Oxygen [at %] | Silicon [at %] | Nitrogen [at %] |
|---|---|---|---|---|
| DMCPS Argon 1 | 50.7 | 25.8 | 25.0 | — |
| DMCPS Nitrogen | 44.7 | 33.3 | 16.3 | 5.7 |
| DMCPS Argon 2 | 60.9 | 30.4 | 8.7 | — |

Note that the sample "DMCPS Argon 1" corresponds to the sample "DMCPS" in Table 1. The sample "DMCPS Nitrogen" was prepared with a nitrogen plasma comprising the precursor DMCPS: this layer comprises nitrogen. Its Fp value is too high. The sample "DMCPS Argon 2" was prepared in conditions similar to those for the sample "DMCPS Argon", but it has a thickness of less than 10 nm: the XPS spectrum reveals a contribution to the signal due to the substrate, and the concentrations indicated therefore do not reflect the composition of the layer deposited by the method according to the invention.

The content of extractible residual siloxane was determined for a sample of plastic film treated by the method according to the invention using the monomer DMCPS. For determining this content of residual siloxane, the 50 cm$^2$ area treated was rinsed with n-hexane, and the liquid phase was concentrated on a ZnSe plate and analysed by Fourier transform infrared spectroscopy (FTIR) (resolution 4 cm$^{-1}$, 8 scans, mirror speed 0.20 cm/s). The siloxane content was determined on the basis of the intensity of a spectral band characteristic of siloxane (between about 2800 and 300 cm$^{-1}$ as indicated in the ECSS reference document *"Space product assurance: Detection of organic contamination of surfaces by infrared spectroscopy"* No. ECSS-Q-ST-70-05C dated 6 Mar. 2009 at point e. page 21 and Table 5.1), calibrated for intensity by a series of poly(dimethylsiloxane) standards, a commercial product from Aldrich, reference 378380 (CAS No. 63148-62-9). The results of this measurement are shown in Table 3. In another procedure the sample is heated under a constant gas stream. The identity and the quantity of the molecules emitted by the sample are determined by gas chromatography with detection by mass spectrometry (GC-MS) (see 4th column in Table 3).

Table 3 shows the results of the measurements of extraction of silicone compounds on the samples treated according to the methods described above.

TABLE 3

| Monomers | Fp MD 15 (N/inch) | Extractible silicone (non-volatile) measured by FTIR (ng/cm$^2$) | Extractible silicone (volatile) measured by the degassing method DHS (ng/cm$^2$) |
|---|---|---|---|
| DMCPS | 0.31 ± 0.21 | 4.15 | 0.24 |
| DMCPS | 0.29 ± 0.23 | 9.67 | Not detected |
| DMCPS | 0.24 ± 0.19 | 9.46 | 0.67 |
| DMCPS | 0.19 ± 0.15 | 0.97 | 0.04 |

Example 2

The peeling force (measurement according to standard FINAT 10) of an adhesive on a protective film according to the invention was compared with the peeling force of the same adhesive on a commercial protective film based on fluorosilicone after being in contact for 20 hours at a temperature of 70° C. and a moisture content of 50%. The results are shown in the FIG. 1. As can be seen, the peeling force of the protective film according to the present invention is lower than that of the protective film based on fluorosilicone.

The average peeling force Fp of an adhesive on a protective film according to the invention is 0.9 N/25 mm.

The average peeling force Fp of an adhesive on a commercial protective film (Fluorosilicone) is 1.0 N/25 mm.

Of course, the present invention is not in any way limited to the embodiments described above, and many modifications may be made to it while remaining within the scope of the appended claims.

What is claimed is:

1. A silicon-based protective film for adhesive or self-adhesive elements, wherein said protective film is based on silicone and has a level of extractible silicone less than or equal to 100 ng/cm$^2$ being measured by the amount of silicone that is released in the form of monomers or oligomers, either non-volatile (IDEMA Standards M7-98 "Organic Contamination as Nonvolatile Residue (NVR)", ECSS-Q-ST-70-05C "Detection of organic contamination of surfaces by infrared spectroscopy", Seagate 20800032-001 Rev C. & 20800014-001 Rev G, Western Digital 2092-772141 Rev AD & 2092-771888 Rev AC), or volatile (IDEMA Standards M11-99 "General Outgas Test Procedure by Dynamic Headspace Analysis", Seagate 20800020-001 Rev N, Western Digital 2092-001026 Rev AC & 2092-771888 Rev AC);
wherein the silicon-based protective film has a level of nitrogen less than or equal to 1 at %, measured according to the XPS/ESCA technique.

2. The silicon-based protective film for adhesive or self-adhesive elements according to claim 1, further comprising a substrate of paper, woven or non-woven fabric or plastic.

3. The silicon-based protective film for adhesive or self-adhesive elements according to claim 1, having at least one of the following characteristics selected from a peeling force less than or equal to 2N/25 mm measured on a Tesa™ 7475 adhesive measured according to standard FTM10, having a residual adhesion greater than or equal to 80%, measured according to standard FTM11, a surface having a static contact angle of water greater than 90°, as measured on Krüss DSA25 apparatus, a surface energy less than 30 mN/metre as calculated from the measurements of contact angle of two liquids (water and diiodomethane) according to the model of Owens and Wendt.

4. An assembly comprising at least one silicon-based protective film for adhesive or self-adhesive elements according to claim 1, and an adhesive or self-adhesive element having a first face provided with adhesive or self-adhesive properties.

5. The assembly according to claim 4, wherein said adhesive element is a label, an adhesive tape, a double-sided adhesive, a protective film, in particular of electronic grade, an adhesive or self-adhesive medical device, such as an adhesive or self-adhesive medical dressing, for example siliconized, a patch, an adhesive electrode intended to be in contact with the skin, in particular of medical grade.

6. A method of producing a silicon-based protective film having a level of nitrogen less than or equal to 1 at %, measured according to the XPS/ESCA technique for adhesive or self-adhesive elements provided with at least one silicone-based coating layer intended to rest on a substrate of paper, woven or non-woven fabric or plastic comprising the following steps a) movement of said substrate from a source of substrate in a plasma coating cell for forming said protective film to a collection point of said protective film,
b) exposure of a first face of said substrate to plasma deposition in a chamber in which there is an atmosphere consisting of at least one plasma gas with discharge controlled by dielectric barrier (DBD) of said plasma gas selected from the rare gases or mixtures thereof in the presence of at least one cyclic siloxanes precursor,
c) formation of said silicone-based coating from said silicone precursor in said plasma and,
d) collection of said protective film provided with said at least one silicone-based coating layer.

7. The method of producing a silicon-based protective film for adhesive or self-adhesive elements according to claim 6, wherein said gas atmosphere in the chamber has an oxygen content less than or equal to 50 ppmv.

8. The method according to claim 6, wherein said substrate moves at a substrate travel speed between 10 and 60 m/min and/or said gas atmosphere in the chamber is at atmospheric pressure ±100 Pa and/or said plasma deposition has a deposition time less than or equal to 4 seconds and/or said discharge is at radio frequency, the unit of area referring to the cumulative area of electrodes.

9. A method of using a protective film according to claim 1 with an adhesive element comprising a first face provided with adhesive or self-adhesive properties and eventually a second non-stick face, said protective film, said protective film being affixed on said first face provided with adhesive or self-adhesive properties and/or said second non-stick face.

10. The method of using a protective film according to claim 9, wherein said adhesive element is a label, an adhesive tape, a double-sided adhesive, a protective film, in particular of electronic grade, an adhesive or self-adhesive medical device, such as an adhesive or self-adhesive medical dressing, for example siliconized, a patch, an adhesive electrode intended to be in contact with the skin, in particular of medical grade.

11. The method of using a protective film according to claim 9, in a clean room.

12. A silicon-based protective film for adhesive or self-adhesive elements according to claim 1, wherein said protective film is based on silicone and has a level of extractible silicone less than or equal to 50 ng/cm2.

13. The silicon-based protective film for adhesive or self-adhesive elements according to claim 1, wherein said protective film is based on silicone and has a level of extractible silicone less than or equal to 10 ng/cm2.

14. The silicon-based protective film for adhesive or self-adhesive elements according to claim 1, wherein said protective film is based on silicone and has a level of extractible silicone less than or equal to 5 ng/cm2.

15. The silicon-based protective film for adhesive or self-adhesive elements according to claim 3, wherein the surface having a static contact angle of water greater than 95°.

16. The silicon-based protective film for adhesive or self-adhesive elements according to claim 3, wherein the surface energy is less than 25 mN/m.

17. The method according to claim 7, wherein the gas atmosphere in the chamber has an oxygen content less than or equal to 20 ppmv.

18. The method according to claim 7, wherein said substrate moves at a substrate travel speed between 10 and 50 m/min.

19. The method according to claim 6, wherein said plasma deposition has a deposition time less than or equal to 2 seconds.

\* \* \* \* \*